Figure 5:
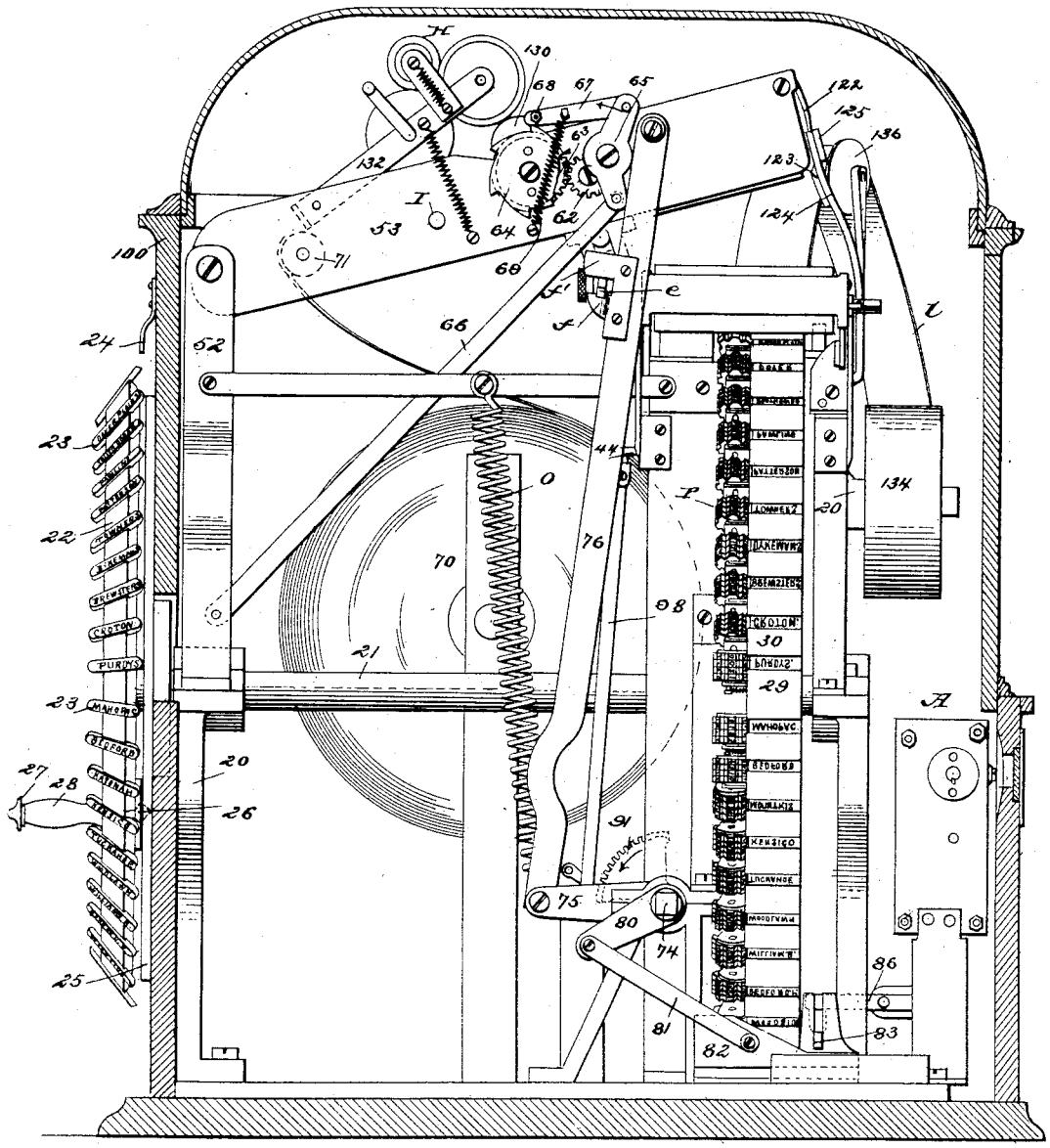

(No Model.)  9 Sheets—Sheet 1.
G. B. MASSEY, Dec'd.
S. R. Massey & S. A. Bryant, Administrators.
TICKET PRINTING MACHINE.
No. 445,251.  Patented Jan. 27, 1891.
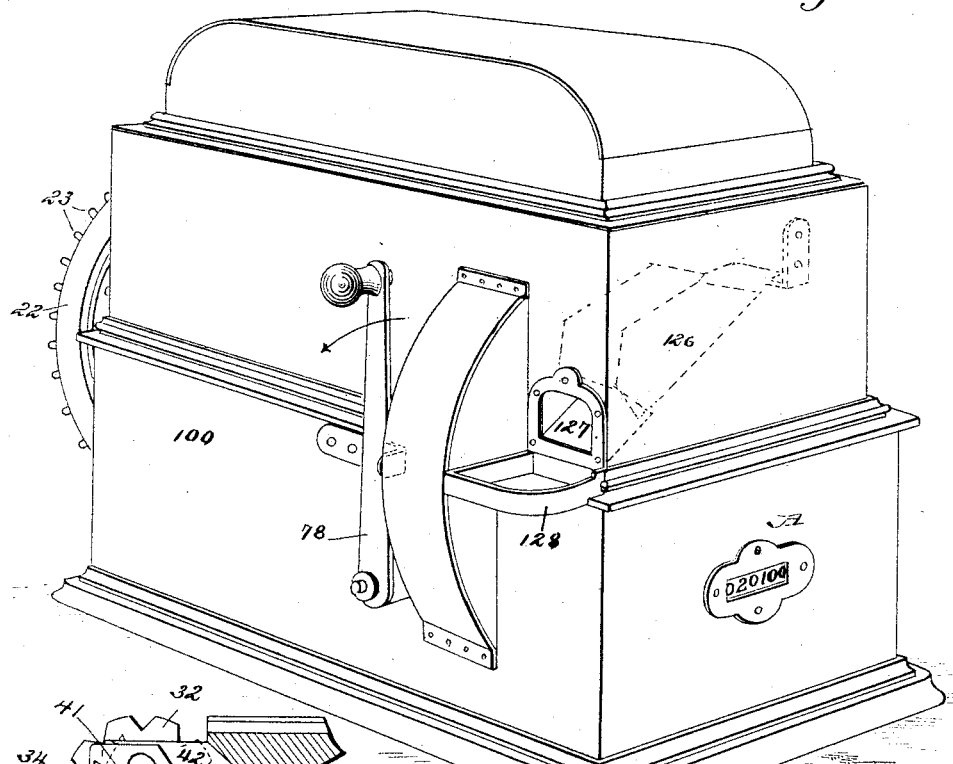
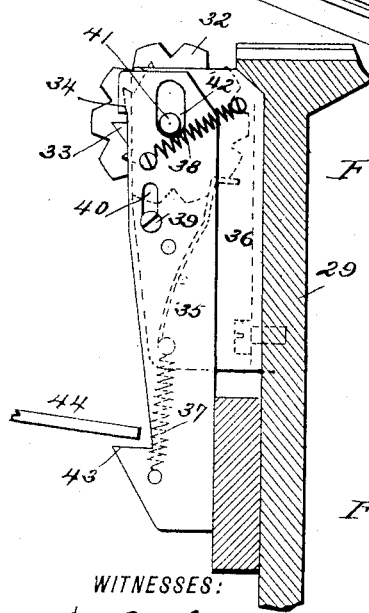
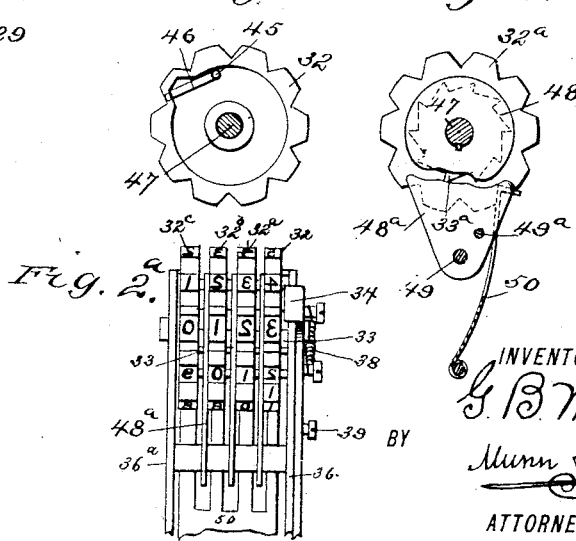
WITNESSES:
INVENTOR:
G. B. Massey
BY Munn & Co.
ATTORNEYS.

(No Model.) 9 Sheets—Sheet 2.

G. B. MASSEY, Dec'd.
S. R. Massey & S. A. Bryant, Administrators.
TICKET PRINTING MACHINE.

No. 445,251. Patented Jan. 27, 1891.

WITNESSES:
W. R. Davis.
Wm W. Duyster

INVENTOR:
G. B. Massey
BY Munn & Co.
ATTORNEYS.

(No Model.) 9 Sheets—Sheet 3.

G. B. MASSEY, Dec'd.
S. R. Massey & S. A. Bryant, Administrators.
TICKET PRINTING MACHINE.

No. 445,251. Patented Jan. 27, 1891.

WITNESSES:
H. R. Davis.
Wm W. Duyster

INVENTOR:
G. B. Massey
BY Munn & Co.
ATTORNEYS.

(No Model.) 9 Sheets—Sheet 4.

G. B. MASSEY, Dec'd.
S. R. MASSEY & S. A. BRYANT, Administrators.
TICKET PRINTING MACHINE.

No. 445,251. Patented Jan. 27, 1891.

WITNESSES:
N. R. Davis.
Wm W. Duyster

INVENTOR:
G. B. Massey
BY Munn & Co.
ATTORNEYS.

(No Model.)  9 Sheets—Sheet 5.

G. B. MASSEY, Dec'd.
S. R. Massey & S. A. Bryant, Administrators.
TICKET PRINTING MACHINE.

No. 445,251.  Patented Jan. 27, 1891.

WITNESSES:
W. R. Davis
Wm W. Duyster

INVENTOR:
G. B. Massey
Munn & Co.
ATTORNEYS.

(No Model.) 9 Sheets—Sheet 6.
G. B. MASSEY, Dec'd.
S. R. MASSEY & S. A. BRYANT, Administrators.
TICKET PRINTING MACHINE.
No. 445,251. Patented Jan. 27, 1891.
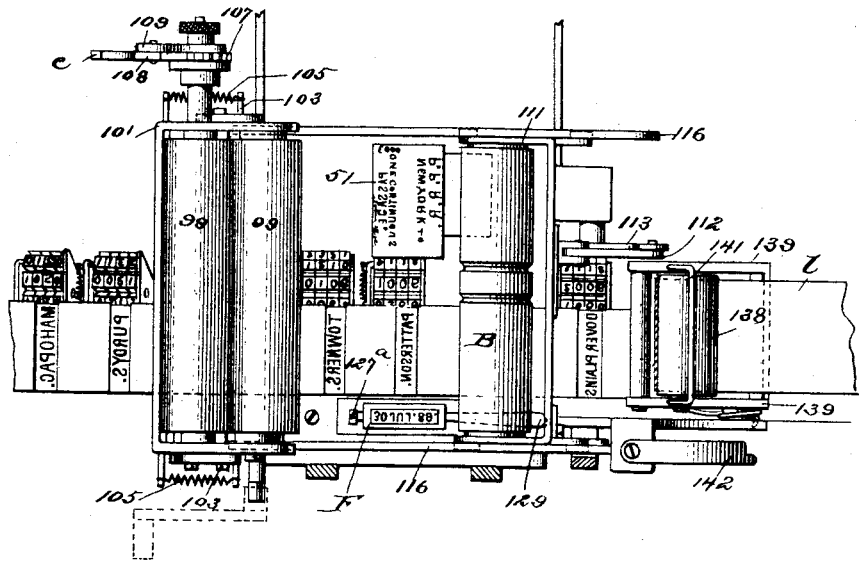
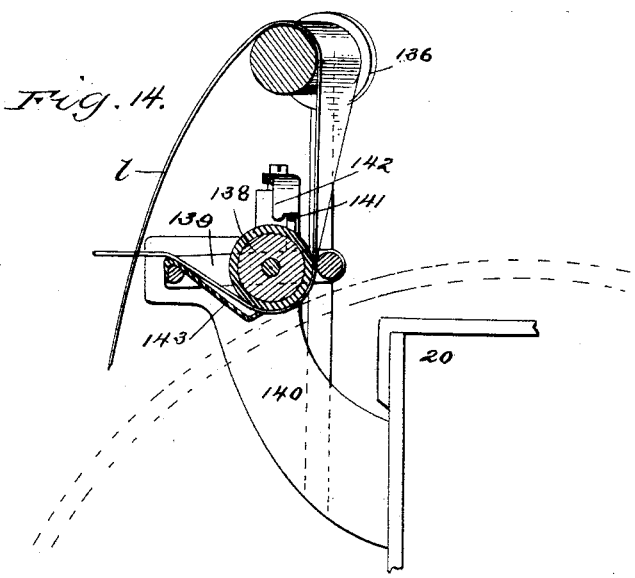
WITNESSES:
INVENTOR:
G B Massey
BY Munn &c
ATTORNEYS.

(No Model.) 9 Sheets—Sheet 7.
G. B. MASSEY, Dec'd.
S. R. MASSEY & S. A. BRYANT, Administrators.
TICKET PRINTING MACHINE.
No. 445,251. Patented Jan. 27, 1891.
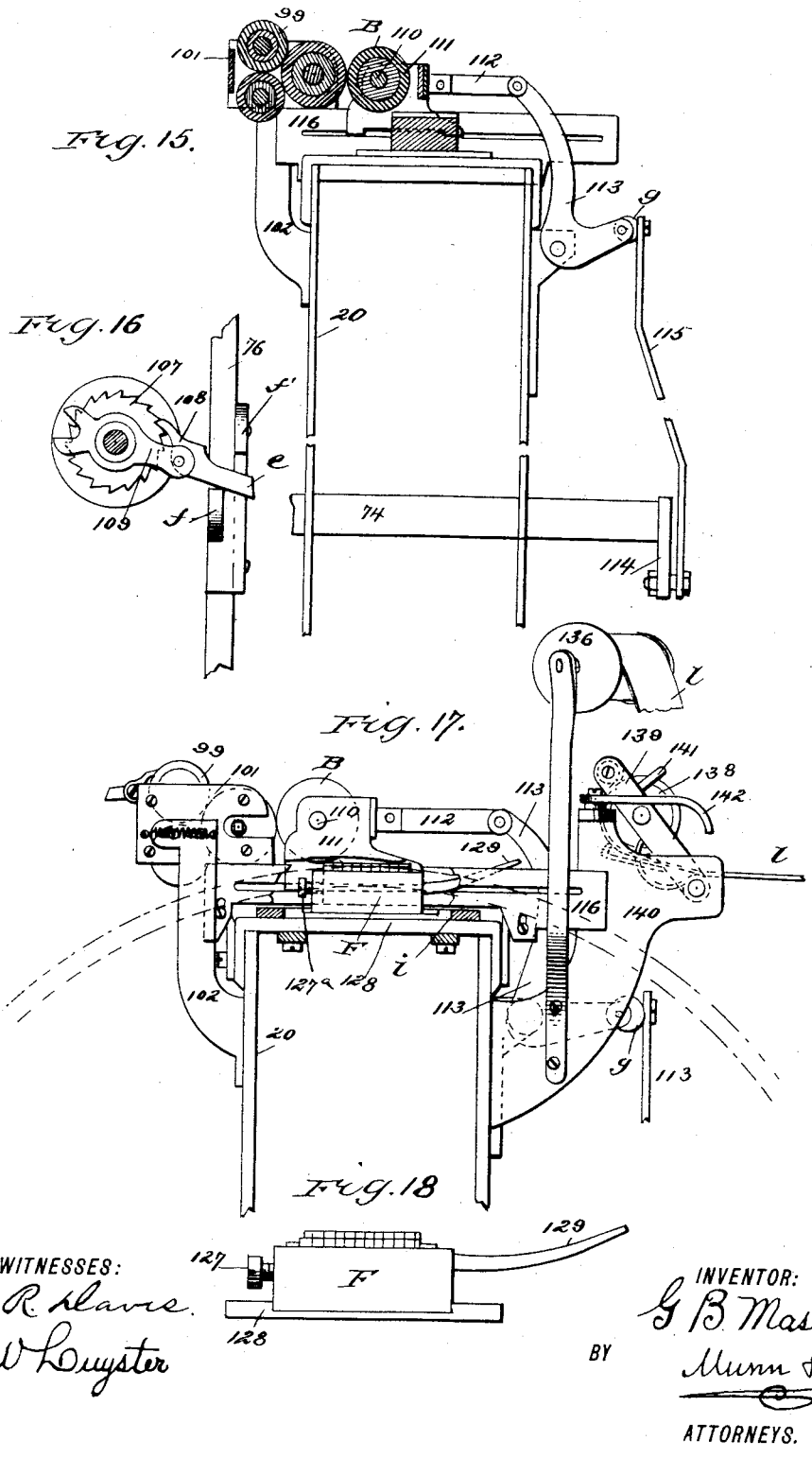
WITNESSES: INVENTOR:

(No Model.)  9 Sheets—Sheet 8.

G. B. MASSEY, Dec'd.
S. R. MASSEY & S. A. BRYANT, Administrators.
TICKET PRINTING MACHINE.

No. 445,251. Patented Jan. 27, 1891.

WITNESSES:
W. R. Davis
Wm. W. Duyster

INVENTOR:
G. B. Massey
BY Munn &Co.
ATTORNEYS.

(No Model.) 9 Sheets—Sheet 9.
G. B. MASSEY, Dec'd.
S. R. Massey & S. A. Bryant, Administrators.
TICKET PRINTING MACHINE.
No. 445,251. Patented Jan. 27, 1891.
Fig. 23.
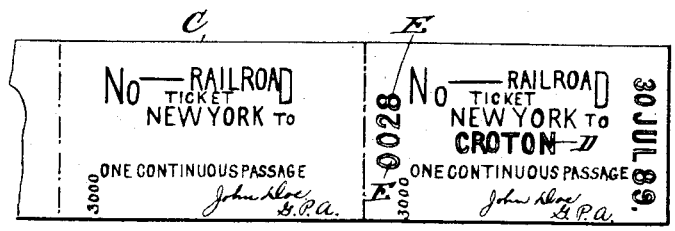
Fig. 24.
Fig. 25.
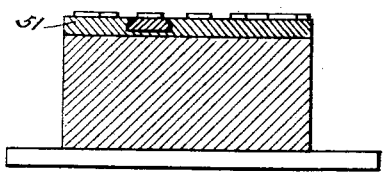
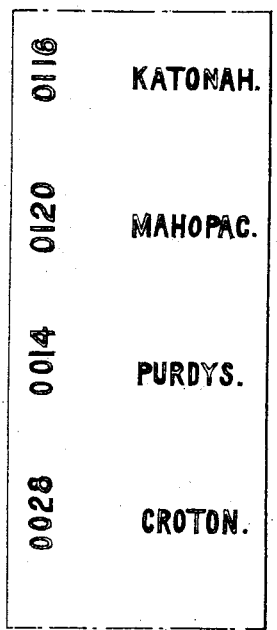
WITNESSES:
W. R. Davis
Wm W Duyster
INVENTOR:
G. B. Massey
BY Munn & Co
ATTORNEYS.

UNITED STATES PATENT OFFICE.

GIDEON B. MASSEY, OF MAMARONECK, NEW YORK; SARAH R. MASSEY AND STANLEY A. BRYANT ADMINISTRATORS OF SAID GIDEON B. MASSEY, DECEASED.

TICKET-PRINTING MACHINE.

SPECIFICATION forming part of Letters Patent No. 445,251, dated January 27, 1891.

Application filed October 19, 1889. Serial No. 327,575. (No model.)

*To all whom it may concern:*

Be it known that I, GIDEON B. MASSEY, of Mamaroneck, in the county of Westchester and State of New York, have invented a new and Improved Ticket-Printing Machine, of which the following is a full, clear, and exact description.

This invention relates to ticket-printing machines of the class illustrated, described, and claimed in Letters Patent of the United States No. 391,544, granted to me on the 23d day of October, A. D. 1888, the main objects of the present invention being to provide for the separate consecutive numbering of all tickets printed and sold from the home station to each station on the line, to provide for the preservation of a record of the gross number of tickets sold at the home station, and to provide for the printing of a report which will show the total number of tickets sold from the home station to each station on the line, which report, when compared with a prior similar report, will enable the operator or the auditor to ascertain the number of tickets sold from the home station to each line-station during the time intervening between the taking of the two reports.

In addition to the above-enumerated objects of my invention, many other minor objects—such as perfect "register," quick and easy adjustment, and the positive action of the numbering attachments—are sought for and obtained by means of the novel constructions, arrangements, and combinations of elements to be hereinafter fully described, and specifically pointed out in the claims.

Reference is to be had to the accompanying drawings, forming a part of this specification, in which similar figures and letters of reference indicate corresponding parts in all the views.

Figure 6:
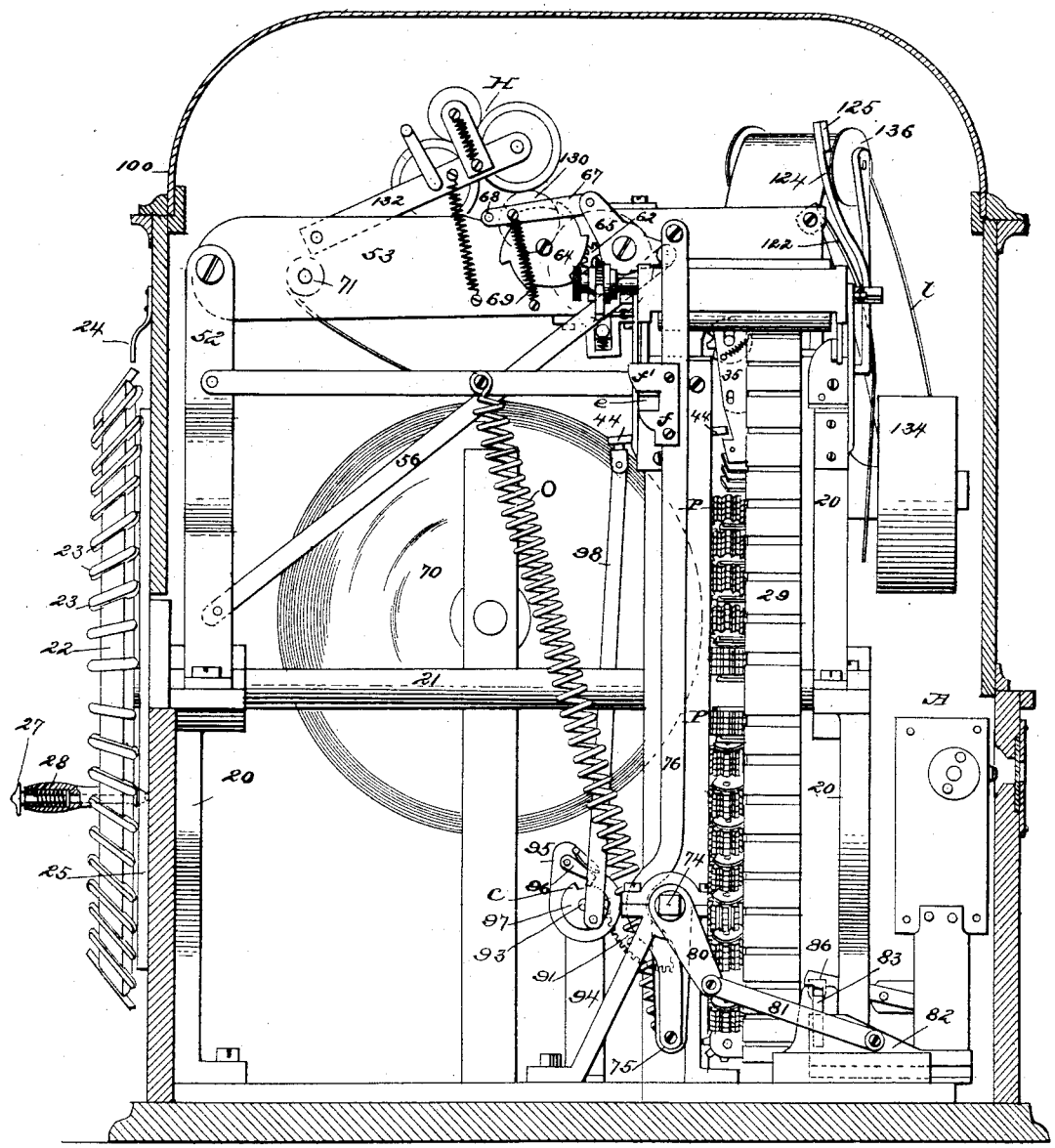
Figure 7:
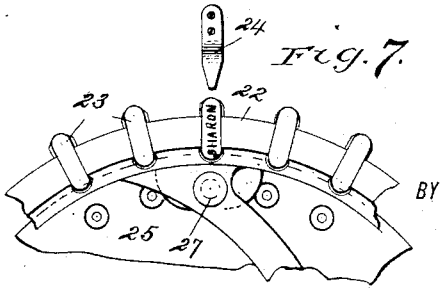
Figure 8:
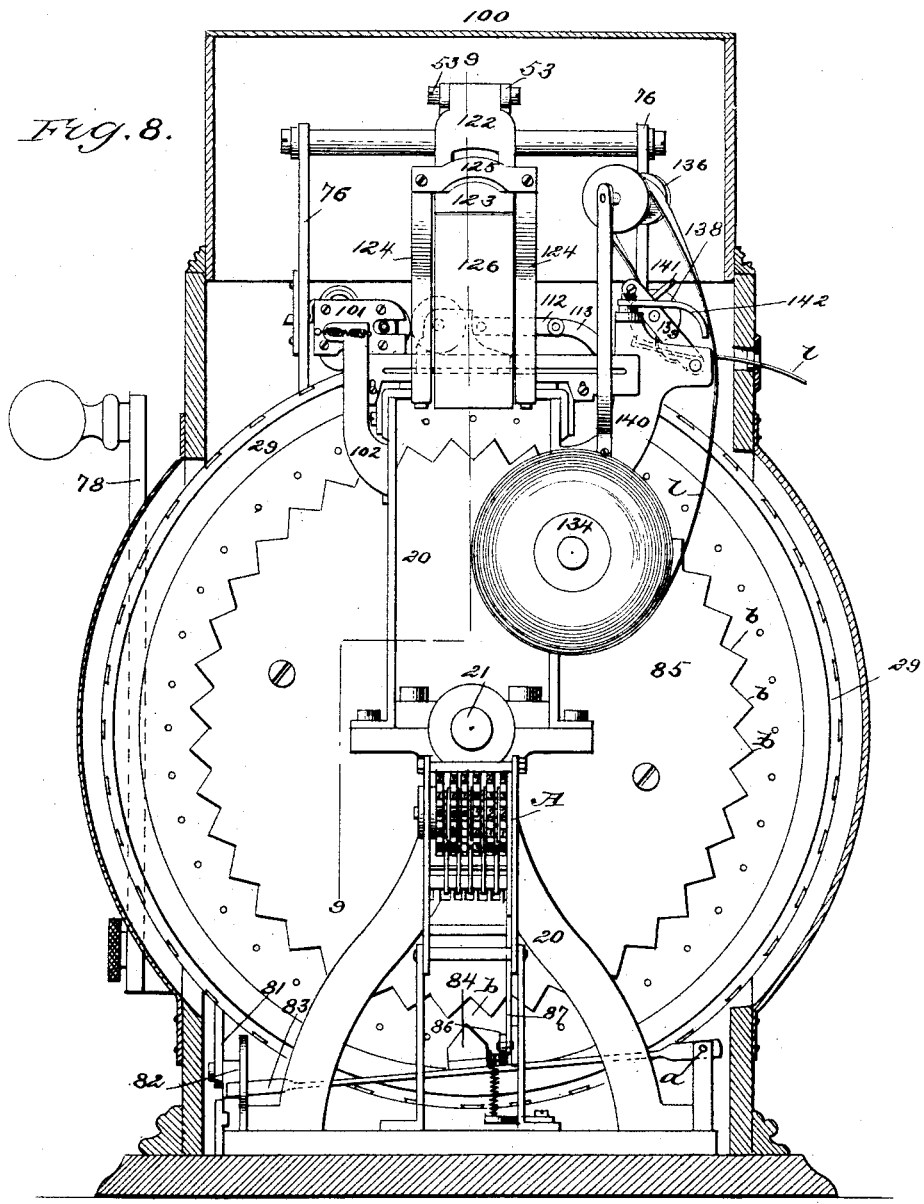
Figure 9:
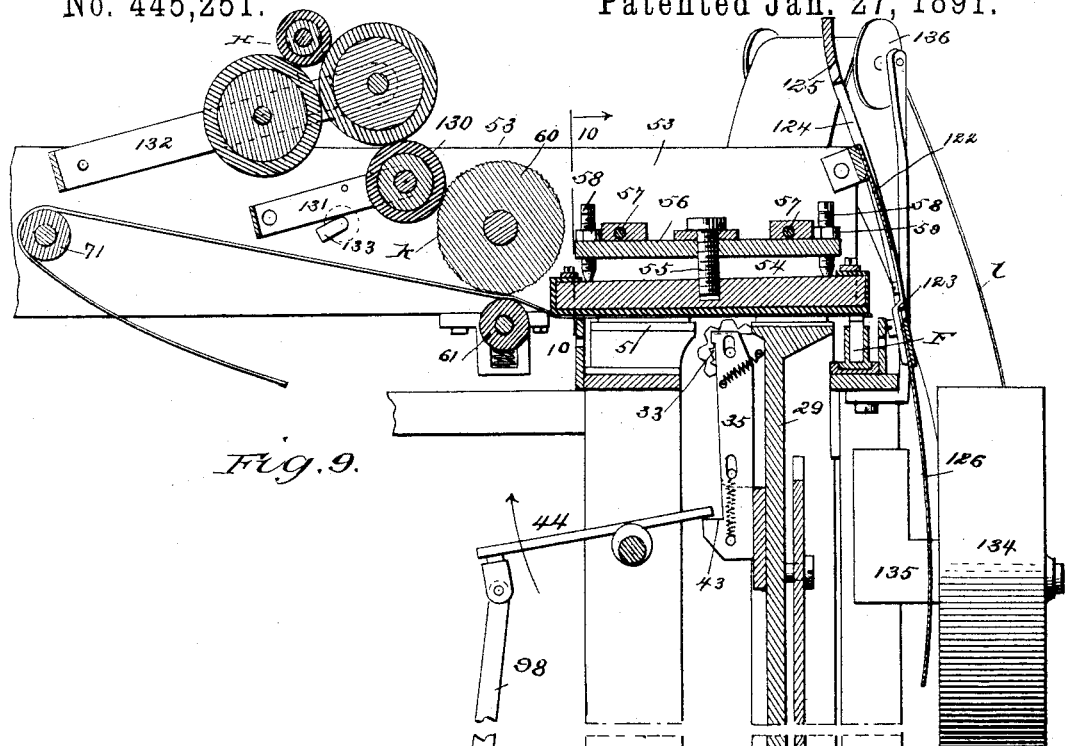
Figure 10:
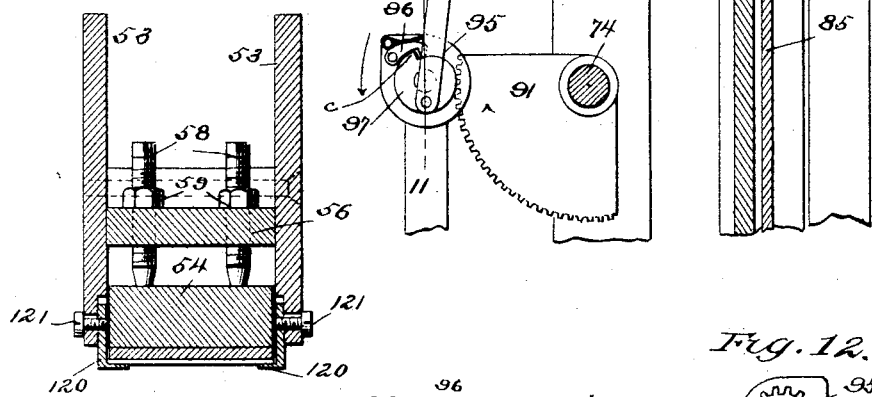
Figures 11, 12:
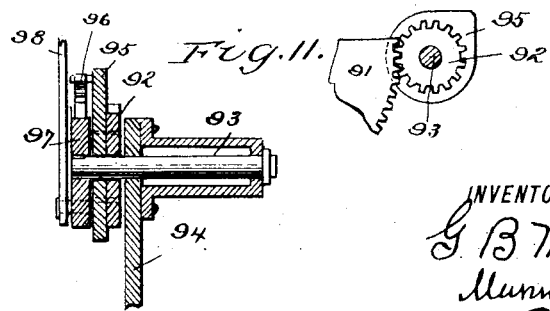
Figure 19:
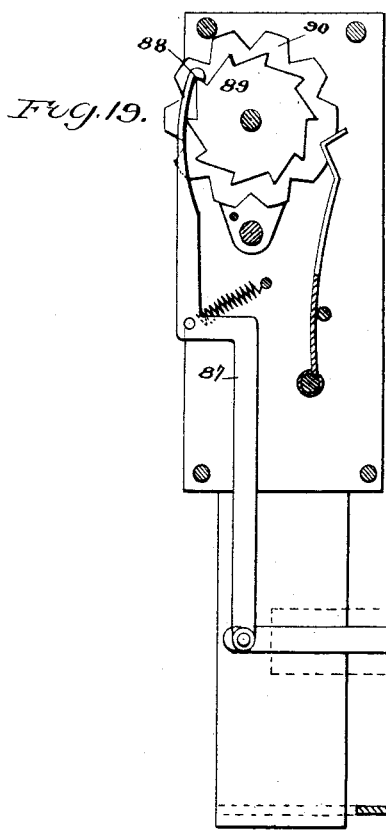
Figure 20:
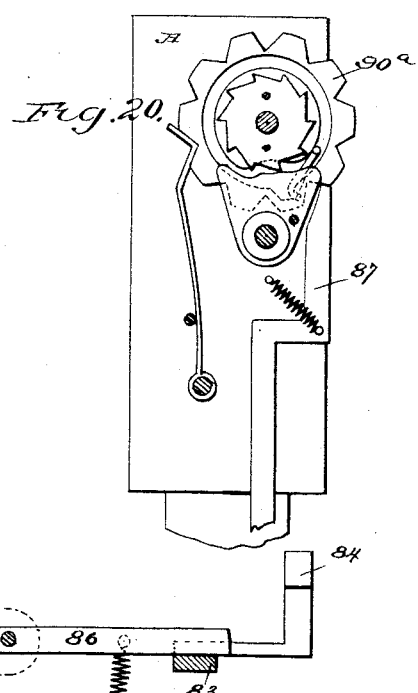
Figure 21:
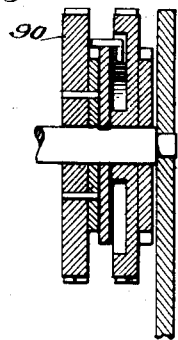
Figure 22:
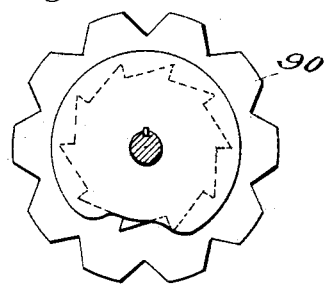

Figure 1 is a perspective view of my improved ticket-printing machine. Fig. 2 is an enlarged detail view of one of the ticket-numbering attachments, a portion of the disk or wheel which carries the destination-plates being shown in section. Fig. 2ᵃ is a face view of one of the sets of numeral-disks. Fig. 3 is a detail side view of one of the numeral-disks. Fig. 4 is a similar view of the opposite side of the disk, the disk-retaining spring and the plates forming the cam-groove in which the advancing finger rides being shown in this figure. Fig. 5 is a side view of the machine, the case being shown in section and the parts being represented as they appear when in their normal position. Fig. 6 is a similar view to Fig. 5, the parts, however, being represented in their printing position, a portion of the handle of the index-wheel being broken away. Fig. 7 is a detail view of a portion of the index-wheel and its register-disk. Fig. 8 is a front view of the machine, the case being shown in section. Fig. 9 is an enlarged sectional detail view on line 9 9 of Fig. 8. Fig. 10 is a cross-sectional view on line 10 10 of Fig. 9. Fig. 11 is a detail sectional view on line 11 11 of Fig. 9. Fig. 12 is a detail view of a portion of the operating mechanism by which the ticket-numbering disks are tripped. Fig. 13 is a plan view of the plate and a portion of the wheel carrying the destination-plates, the platen being removed. Fig. 14 is a sectional detail view of the "report" printing attachment. Fig. 15 is a detail view illustrating the arrangement of the ink-distributing mechanism, parts being shown in section. Fig. 16 is a detail view illustrating the attachment by means of which the ink-distributing rollers are turned. Fig. 17 is a detail view of the plates, slides, and ink-distributing attachment. Fig. 18 is a side view of the case in which the date-printing type is set up. Fig. 19 is a detail view of one of the general numbering-disks. Fig. 20 is a view of the opposite side of said disk. Fig. 21 is a sectional view of the general numbering-disks, the view being taken upon a line parallel with the disk-shaft axis. Fig. 22 is an enlarged side view of one of the general numeral-disks. Fig. 23 is a view of a partially and a fully printed ticket. Fig. 24 is a view of a portion of the slip upon which the report is printed, and Fig. 25 is an enlarged cross-sectional view of the body-printing plate.

In the drawings above referred to, 100 represents the casing of the machine, within which casing all of the working parts of the apparatus are mounted, such parts being preferably supported by a frame 20, that is mounted within the case. This frame 20 serves as a bearing for a longitudinal shaft 21, to the rear end of which there is rigidly secured an index wheel or disk 22, which said wheel or disk is formed with a number of dovetail slots, in which there are fitted plates 23, the names of the stations to which tickets are to be sold being engraved on said plates. Above the disk or wheel 22 I arrange a pointer or index-finger 24, which serves as a guide in bringing the parts to the proper printing position.

In order that the wheel 22 may be brought into approximate register, I mount a disk 25 just to the rear of the wheel, such disk being rigidly connected to the casing 10C, and in the side face of this disk I form as many apertures as there are dovetail slots in the wheel 22, such apertures, which are formed with flaring side walls, being arranged so that they will be entered by a conical head 26, that is formed upon a spring-pressed stem 27, such stem being mounted within the wheel-handle 28. Upon the opposite end of the shaft 21 I mount a wheel or disk 29, which is also formed with a number of dovetail grooves, and in these grooves there are fitted printing-plates 30, bearing the names of the stations to which tickets are to be sold, the plates 30 and 23 being inserted so that they will correspond—in other words, so that when one of the plates 23 is directly beneath the pointer 24 the corresponding plate 30 will be in printing position.

In connection with each of the plates 30 I arrange a set or series P of numbering-disks, four of such disks being by preference employed in each set, the disks representing units, tens, hundreds, and thousands. The unit-disk 32 carries upon its right, when in printing position and looking toward the front of the machine, a ratchet-wheel 33, which wheel is at times engaged by a tongue 34, that is carried by a slide 35, such slide being loosely mounted upon a flange or web 36, that is rigidly connected to the wheel 29, the slide being normally upheld by a spiral spring 37, as indicated in Fig. 2, while the tongue formed upon the slide is normally held against the edge of the flange or web 36 by a spring 38. The slide is held to the web or flange by a set-screw 39, which passes through a slot 40, the head of the screw overlapping the side faces of the flange, while the upper edge of the flange is guided by a stud 41, which extends from the web or flange through a slot 42, that is formed in the slide. Near the lower end of the slide there is a shoulder 43, upon which the operating-lever 44 bears at each imprint when the particular set of numbering-disks in connection with which the slides is arranged is in printing position.

Upon the opposite side of the numeral-disk 32 I arrange a laterally-extending finger 45, the finger extending outward from an arm 46, that is pivotally connected to the disk. The disk 32, as well as the other disks $32^a$, $32^b$, and $32^c$ of the series, is mounted upon a short shaft 47, that is supported at one end by the flange or web 36 and at the other end by a similar flange or leaf $36^a$. The disk $32^a$ (which is the "tens" printing-disk) carries a ratchet $33^a$, and between the disks 32 and $32^a$ I mount a cam-faced disk 48, the main section of the face of this disk overlapping the ratchet-teeth and holding the finger 45 of the disk 32 from engagement with said teeth; but the lower portion of the disk 48, which disk is held in rigid connection with the shaft 47, is recessed, so that at every revolution of the disk 32 the finger 45 will be carried into engagement with one of the teeth of the ratchet $33^a$, and such ratchet will be advanced, the disk being guided to the ratchet-teeth by a cam $48^a$, that is complementary to the recessed section of the cam-disk 48, the cam $48^a$ being mounted upon short shafts or studs 49 and $49^a$, that are carried by the flanges or webs 36 and $36^a$.

To prevent any retrograde movement of the disks 32, $32^a$, $32^b$, and $32^c$, I arrange springs 50, as best shown in Figs. $2^a$ and 4, such springs by preference consisting of a single piece of metal that is slotted at the end to engage each separate disk, as represented. The disks to the left of the disk $32^a$ are operated in the same manner at every complete revolution of the adjacent disks to the right.

Upon a line just above the peripheral face of the wheel 29 I mount a plate 51, upon which the main body of the ticket is printed, space for the date, the name of the station to which the ticket is to be sold, and for the number being, however, left, the printing-surface of the plate 51 being upon a level with the surface of any of the plates 30 when such plates 30 are brought into printing position.

The frame 20 carries two upwardly-extending standards 52, and between these standards there is mounted a heavy frame 53, which carries a platen 54, the platen being upheld by a set-screw 55, which passes through a plate 56, said plate being rigidly held to the side strips of the frame 53 by transverse bolts or screws 57. To bring about a proper adjustment of the platen 54, I provide four adjusting-screws 58, each of which carries a lock-nut 59, the arrangement being such that the platen may be raised or lowered or set at any desired angle, so as to obtain a proper impression.

Just to the rear of the platen I mount a feeding-roller 60, which by preference is formed with an engraved peripheral face, and beneath the feeding-roller 60 is yieldingly mounted a feeding-roller 61. The shaft of the roller 60 carries a pinion 62, which said pinion is engaged by a gear 63, that is studded to the side of the frame 53, a ratchet 64 being rigidly connected to said gear. In advance of the ratchet 64 I mount a lever 65, which is connected by a link 66 with one of the standards 52, and to the upwardly-extending arm of this lever 65 is connected a rearwardly-extending link 67, which has a finger 68, adapted to engage the ratchet 64, the finger being held in engagement with the ratchet by a spring 69, which extends from the link to the frame 53. From this construction it will be seen that at any downward movement of the platen-carrying frame the lever 65 will be thrown, as indicated by the arrow shown in connection therewith in Fig. 5, to the position in which the parts are shown in Fig. 6, thus carrying the finger 68 to a position such that it will engage the next succeeding tooth of the ratchet, so that when the platen-carrying frame is again raised the ratchet will be turned, and in turning will impart a proper motion to the feeding-roller 60 to feed forward one ticket, the parts being so proportioned that at every throw of the platen-carrying frame the feeding-rollers will act to feed the web from which the tickets are to printed forward just the exact length of the complete ticket, the web from which the tickets are printed being carried to the feeding-rollers from a reel 70, passing first about a guiding-roll 71, that is journaled between the side lengths of the frame 53.

In order that the platen-frame may be lowered to bring the platen to printing position, I provide a heavy transverse shaft 74, which carries two rearwardly-extending crank-arms 75, which said arms are connected with the frame 53 by upwardly-extending links 76, and in order that the shaft 74 may be turned I provide such shaft with a crank arm or handle 78, the parts being normally held in the position in which they are shown in Fig. 5 by a spring O. An inspection of Figs. 5 and 6 will show that as the shaft 74 is turned by throwing its crank-arm, as indicated by the arrow shown in Fig. 1, the crank-arm 75 will be carried downward against the tension of the spring O, and just as the parts approach the position in which they are shown in Fig. 6 the effect of the power applied to the crank-arm 78 will be greatest upon the platen-frame, so that an exceedingly heavy pressure may be secured at the time the imprint is taken.

In addition to the crank-arms 75, the shaft 74 carries an arm 80, and this arm 80 is connected by a link 81 with an incline-faced slide 82, the slide normally resting in the position in which it is shown in Fig. 5; but as the shaft 74 is turned, as above described, so as to throw the platen to printing position, the slide is advanced to the position in which it is shown in Fig. 6, and in so advancing bears upon and raises a lever 83, which carries an angular projection 84, the lever being fulcrumed at $a$. (See Fig. 8.) This angular projection 84 so carried by the lever 83 is arranged so that as it rises it will bear in one of a number of recesses $b$, that are formed in the peripheral edge of a disk 85, that is rigidly connected to the wheel 29, the recesses being so proportioned that when the projection 84 enters a recess the disk, and with it the wheel 29, will be moved so that one of the plates 30 will be carried to the exact position required to print the name carried by the plate in the space left for such name in the ticket. A further use of the lever 83 is to raise the end of a lever 86, which said lever 86 is pivotally connected to a link 87, formed with a catch-hook 88, adapted to engage a ratchet 89, that is carried by the numeral-disk 90 of a series of disks A, that are arranged in all respects as are the disks 32 $32^a$ $32^b$ $32^c$, the series A, however, being employed for the purpose of recording the gross number of tickets printed by the machine.

In order that the slide of one of the disks 32 may be tripped at each throw of the platen-frame, I mount a segment 91 upon the shaft 74, and this segment I arrange so that it will engage a gear 92, that is loosely mounted on a shaft 93, said shaft being supported by a standard 94. The pinion carries a disk 95, to which there is pivotally connected a spring-pressed pawl 96, and upon the extreme end of the shaft 93 is mounted a cam-faced crank-disk 97, formed with a bearing-face $c$, which at times is engaged by the pawl 96. The disk 97 is connected with the lever 44 by a link 98, the arrangement being such that as the crank-arm 78 is thrown downward to carry the platen to printing position the segment 91 will be moved in the direction of the arrow shown in connection therewith in Fig. 5, and as the segment so moves the gear, and with it the pawl-carrying disk 95, will be carried around until the pawl will engage the shoulder $c$, as represented in Fig. 9. Then when the lever 78 is thrown upward, so as to move the segment, as indicated by the arrow shown in Fig. 9, the gear will be moved so as to carry the pawl-carrying disk in the direction of the arrow shown in connection therewith in Fig. 9, and the link 98 will be moved so that the lever 44 will be carried as indicated by its arrow, and as the lever so moves the slide 35, that is in position to be borne upon, will be carried downward and the disk 32 will be advanced one step.

In the operation of printing it becomes necessary that the plate 51, the characters of the ticket-printing disks, and the plates 30 should be inked, and to bring about this inking of the parts referred to I mount a number of ink-distributing rolls 99 in a frame 101, such frame being supported by arms 102, that extend upward from the main frame 20. The frame 101 is provided with laterally-extending studs 103, which ride in slots formed in the arms 102, the frame 101 being normally held forward by springs 105.

The ink is supplied to the rollers 99, and in order that it may be regularly distributed after having been first applied I form the shaft of one of the rollers 99 so that it will fit the socket of a crank-arm, as indicated in Fig. 13, and in order that the rollers 99 may be turned slightly at each throw of the platen-carrying frame I mount upon one of the rollers a ratchet 107, which said ratchet is engaged by a pawl 108, that is pivotally connected to an arm 109, the arm 109 being loosely mounted on the shaft of the roller which carries the ratchet, while the ratchet proper is formed with an extension $e$, which as the platen-frame is moved upward is engaged by a projection $f$, that is carried by one of the links 76, the pawl being at this time moved so that the ratchet will be carried forward, and with it the ink-distributing rolls, and in order that the pawl may be moved to a position so that it will be engaged upon the next upward movement of the frame I provide the link 76 with a second projection $f'$, which bears upon the pawl projection as the platen-frame is being moved downward and carries the pawl downward, so that it will engage with one of the succeeding ratchet-teeth.

The inking-rollers proper are carried by a shaft 110, which is supported by a carriage 111, and this carriage is connected by a link 112 with a lever 113, the lever 113 being in turn connected with a crank 114, that is carried by the shaft 74, the connection between the crank 114 and the lever 113 being established by a link 115, the joint between the link and the lever being a double joint—that is, the upper end of the link is pivotally connected to a block $g$, which block in turn is pivotally connected to the lever. The carriage 111 is mounted to slide in ways 116, the arrangement being such that when the parts are in the position in which they are shown in Fig. 5 the printing-rollers, which are shown at B in Figs. 15 and 17, will be close up against the inking-rollers 99, but upon the initial downward movement of the lever 78 the lever 113 will be rocked so as to carry the inking-rollers across the face of the type. After passing from the feeding-rollers 60 and 61 the web from which the tickets are to be printed, which, as before stated, is led from the reel 70 to and about the roller 71 and then onto the feeding-rollers, is carried beneath the platen, the side edges of the web at this time being supported by adjustable guides 120, such guides being held to the frame 53 by set-screws 121. (See Fig. 10.)

To the forward edge of the frame 53 I pivotally connect a frame 122, which carries a knife-blade 123, and to the frame 20 are connected two upwardly-extending standards 124, which carry a knife-blade 125. It will be remembered that as the frame 53 rises after the impression has been taken the feeding-roller 60 is turned so as to feed the web forward the exact length of one ticket, the parts being so timed and connected that just as the full length of the ticket has been fed forward the two knife-edges 123 and 125 will come together and the ticket will be severed, being guided downward from the knife by an apron 126 to a trough 127 to be delivered thence to a tray 128. The platen is the full length of two tickets, so that at every throw of the platen the main body of one ticket is printed, as shown at C in Fig. 23, while upon the body of the printed ticket printed at the preceding throw there is imprinted the name of the station to which the ticket is sold, as shown at D upon the right in Fig. 23, and there is also printed upon the body of the ticket the number (shown at E) of the tickets sold from the home station to the particular destination printed at D. In addition to the number E the date of issue is also printed upon the ticket, the type from which said date is printed being set up in a case F and locked therein by means of a set-screw $127^a$. This case F is formed with a base-plate 128 and provided with a handle 129, and is each day removed from the machine in order that the proper characters may be set up. The case is then inserted in the position in which it is shown in the drawings, the frame 20 being provided with a recess $i$, adapted to receive the base-plate 128.

It might at times be deemed advisable to print a general design upon the back of the tickets, and to this end I would in practice engrave the peripheral face of the feeding-roller 60, as shown at $k$, and in order that the engraved face may be inked I would provide an inking-roller 130, supporting said roller by arms 131, that are pivotally supported by the frame 53, and in connection with the inking-roller 130 I would arrange a group of ink-distributing rollers, as shown at H, such rollers being supported by arms 132, that are pivotally connected to the frame 53.

Referring to Fig. 9, it will be seen that the inking-roller and the ink-distributing roller are in a position such that the inking-roller will bear upon the peripheral face of the roller 60, and when the parts are in such position the back of the web will be printed as it is fed forward; but if a plain-backed ticket is desired, as would generally be the case, the roller 130 could be moved upward from the roller 60 by turning a thumb-screw I, which controls a lifting-arm 133.

In order that the "report" referred to in the statement of the objects of my invention may be taken from the machine, I provide a web $l$, which is wound upon a reel 134, the reel being supported by a bracket 135, as shown in Figs. 5, 6, 8, and 9. The web $l$ is led upward from its reel to a guiding-roller 136, and thence downward and about an impression cylinder or roller 138, which is journaled in arms 139, that are pivotally supported by brackets 140. The arms 139 carry a cross rod or bar 141, and to one of the brackets 140 there is pivotally connected a spring 142, which may be moved to the position in which the parts are shown in Fig. 14, the spring at this time acting to hold the impression cylinder or roller in a position such that the web $l$ will be pressed against the destination-plate-carrying wheel and the numbering devices carried thereby;

and the parts being in this position it will be seen that by grasping the handle 28, so as to turn the shaft 21, the wheel 29 will be advanced and an impression will be taken from each of the destination-plates and their numbering devices, the arrangement being such that a report may be taken at any time, and a comparison of the two reports will enable the auditor or operator to determine the exact number of tickets sold during the time intervening the taking of such reports. After the report has been taken the spring 142 is turned back to the position in which it is shown in Fig. 17, and when the spring 142 is so turned back a spring 143 will act to return the arms 139 and the cylinder or roller carried thereby to the position in which the parts are shown in said Fig. 17. The reports taken may be verified by adding the number of the separate sets of tickets and comparing the result with the number indicated by the gross-numbering attachment A.

Although I have described my invention in connection with a machine arranged to print railway-tickets, I desire it to be distinctly understood that the machine might be modified to print any other form of ticket.

Having thus described my invention, I claim as new and desire to secure by Letters Patent—

1. In a ticket-printing machine, the combination, with a wheel adapted to receive a number of destination-plates, of a number of sets of numeral-disks carried by the wheel, a means, substantially as described, for throwing the disks, and a means, substantially as described, for turning the wheel, substantially as described.

2. In a ticket-printing machine, the combination, with a wheel formed with grooves in its peripheral face, of destination-plates arranged to fit said grooves, independent sets of numeral-disks carried by the wheel, a set of numeral-disks being arranged in connection with each destination-plate, a disk-operating mechanism, and a means, substantially as described, for turning the wheel, substantially as described.

3. In a ticket-printing machine, the combination, with a destination-plate-carrying wheel, of a number of sets of numeral-disks carried thereby, an index-wheel arranged in connection therewith, and a means, substantially as described, for turning the wheels in unison.

4. In a ticket-printing machine, the combination, with a destination-plate-carrying wheel, of a number of sets of numeral-disks carried thereby, an index-wheel arranged in connection therewith, means, substantially as described, for bringing the destination-plate wheel into register, and a means for turning the wheels in unison.

5. In a ticket-printing machine, the combination, with a body-printing plate, of a wheel carrying a number of destination-printing plates, a number of sets of numeral-disks carried by the wheel, a disk-operating attachment, a platen, feeding-rollers, and means, substantially as described, for turning the wheel, turning the rollers, and throwing the platen, as and for the purpose stated.

6. In a ticket-printing machine, the combination, with a body-printing plate formed with a groove adapted to receive a plate carrying the name of the station from which the ticket is sold, of a wheel carrying a number of destination-printing plates, a number of sets of numeral-disks carried by the wheel, a disk-operating attachment, a platen, feeding-rollers, and means, substantially as described, for turning the wheel, turning the rollers, and throwing the platen, as and for the purpose stated.

7. In a ticket-printing machine, the combination, with a body-printing plate, of a wheel carrying a number of destination-printing plates, a case carrying a set of dating-types, a number of sets of numeral-disks carried by the wheel, a disk-operating attachment, a platen, feeding-rollers, and means, substantially as described, for turning the wheel, turning the rollers, and throwing the platen, as and for the purpose stated.

8. In a ticket-printing machine, the combination, with a body-printing plate, of a wheel carrying destination-printing plates, an index-wheel, a shaft common to the two wheels, a number of sets of numeral-disks arranged in connection with the destination-printing plates, a platen, feeding-rollers, and means, substantially as described, for throwing the numeral-disks, turning the wheels, and throwing the platen, as and for the purpose stated.

9. In a ticket-printing machine, the combination, with a body-printing plate, of a wheel carrying destination-printing plates, an index-wheel, a shaft common to the two wheels, a number of sets of numeral-disks arranged in connection with the destination-printing plates, a means, substantially as described, for throwing the numeral-disks, a platen, feeding-rollers, a web-severing attachment, and means, substantially as described, for turning the wheels, turning the rollers, and throwing the platen, as and for the purpose stated.

10. In a ticket-printing machine, the combination, with a body-printing plate, of a wheel carrying a number of destination-printing plates, a number of sets of numeral-disks carried by the wheel, a disk-operating attachment, a platen, feeding-rollers, one of which rollers is a printing-roller, an inking device arranged in connection with the printing-roller, and means, substantially as described, for turning the wheels, turning the feeding-rollers, and throwing the platen, as and for the purpose stated.

11. In a ticket-printing machine, the combination, with a body-printing plate, of a wheel carrying destination-printing plates, an index-wheel, a number of sets of numeral-disks arranged in connection with the destination-printing plates, a means, substantially as described, for throwing the numeral-disks, a platen, a means, substantially as described, for recording each throw of the platen, feeding-rollers, and means, substantially as described, for turning the wheels, turning the feeding-rollers, and throwing the platen, as and for the purpose stated.

12. In a ticket-printing machine, the combination, with a wheel carrying a number of destination-printing plates, of an index-wheel arranged in connection therewith, a handle carried by the index-wheel, a spring-pressed stem arranged within the handle, a fixed disk formed with apertures arranged to be entered by the stem-head, a number of sets of numeral-disks arranged in connection with the destination-printing plates, a platen, feeding-rollers, and means, substantially as described, for throwing the numeral-disks, throwing the platen, turning the index and destination-plate-carrying wheels, and for turning the feeding-rollers, as and for the purpose stated.

13. In a ticket-printing machine, the combination, with a ticket-printing mechanism, of a numbering mechanism consisting of a set of numeral-disks loosely mounted on a shaft and provided with ratchet-teeth, cam-disks rigidly mounted on a shaft and formed with recesses, fingers pivotally connected with the numeral-disks and for engaging the adjacent ratchets when not prevented by the adjacent cams, cams which are complementary to the recessed section of the cam-disks, and connections, substantially as described, whereby when a ticket is printed the right-hand disk will be advanced one step, as and for the purpose stated.

14. In a ticket-printing machine, the combination, with a ticket-printing mechanism, of a ticket-numbering mechanism consisting of a set of numeral-disks loosely mounted on a shaft and provided with ratchet-teeth, cam-disks rigidly mounted on a shaft and formed with recesses, fingers pivotally connected with the numeral-disks and for engaging the adjacent ratchets when not prevented by the adjacent cams, cams which are complementary to the recessed sections of the cam-disks, springs arranged in connection with the disks, and connections, substantially as described, whereby the right-hand disk will be advanced when a ticket is printed, substantially as described.

15. In a ticket-printing machine, the combination, with a ticket-printing mechanism, of a ticket-numbering device consisting of a set of numeral-disks provided with ratchets and loosely mounted on a shaft, cam-disks rigidly mounted on the shaft between the disks, fingers pivotally connected to the disks and arranged to overlap the cams and ratchets to the left, complementary cams, springs arranged in connection with the disks, a slide formed with a tongue adapted to engage the ratchet of the right-hand numeral-disks, springs arranged in connection with the slide, and a means, substantially as described, for throwing the slide, substantially as described.

16. In a ticket-printing machine, the combination, with a ticket-printing mechanism, of a ticket-numbering mechanism consisting of a number of numeral-disks provided with ratchets and loosely mounted on a shaft, cam-disks rigidly mounted on the shafts between the disks, fingers pivotally connected with the disks and arranged to overlap the cams and ratchets to the left, complementary cams, springs arranged in connection with the disks, a slide formed with a tongue adapted to engage the ratchet of the right-hand numeral-disks, springs arranged in connection with the slide, a lever 44, arranged to bear upon the slide, a cam-disk 97, rigidly mounted on a shaft, a pawl-carrying disk 95, such pawl being arranged to engage the crank-disk, a gear 92, arranged in connection with the disk 95, a segment 91, and a means, substantially as described, for throwing the segment, the segment being arranged to engage the gear, substantially as described.

17. In a ticket-printing machine, the combination, with a destination-plate wheel, of a number of sets of numeral-disks carried by the wheel, a means for revolving the wheel, an impression-roller, a web-carrying reel, and a means, substantially as described, for holding the impression-roller against the destination-plates, substantially as described.

18. In a ticket-printing machine, the combination, with a destination-plate-carrying wheel, of a number of sets of numeral-disks carried by the wheel, a numeral-disk-operating mechanism, an impression-roller 138, a spring 142, arranged in connection therewith, a web-carrying reel, and a means, substantially as described, for revolving the destination-plate-carrying wheel, substantially as described.

19. In a ticket-printing machine, the combination of a wheel carrying ticket-numbering disks, a means for taking an impression or report of said disks, consisting of an impression-roller mounted in a frame that is pivoted to be thrown toward the numbering-disks when desired to take a report, and a ticket-printing mechanism, substantially as described.

20. In a ticket-printing machine, the combination of a wheel carrying numbering-disks, a pivotally-mounted impression-roller for taking an impression or report of said disks, and a spring normally maintaining said impression-roller out of contact with the said disks, substantially as described.

21. The combination, in a printing-machine and with the ticket-numbering mechanism thereof, of a means for taking a report or impression of said numbering mechanism, consisting of an impression-roller normally maintained out of contact with the numbering mechanism, but movable into contact therewith when it is desired to take a report, substantially as described.

22. The combination, in a ticket-printing machine, of a wheel carrying destination-plates and carrying sets of numbering-disks corresponding to said destination-plates, a series of recording-disks recording the whole number of tickets printed, and a means for taking an impression or report of the numbering-disks, consisting of an impression-roller movable into contact with the wheel carrying said numbering-disks, substantially as described.

GIDEON B. MASSEY.

Witnesses:
   EDWARD KENT, Jr.,
   C. SEDGWICK.